Patented Feb. 11, 1947

2,415,793

UNITED STATES PATENT OFFICE 2,415,793

DITHIOPYRIMIDINES AND PROCESS OF PREPARING SAME

George H. Hitchings, Tuckahoe, and Gertrude B. Elion, New York, N. Y., assignors to Burroughs Wellcome & Co. (U. S. A.) Inc., New York, N. Y., a corporation of New York No Drawing. Application September 12, 1945, Serial No. 615,926

9 Claims. (Cl. 260—251)

The present invention refers to dithiopyrimidines and to a new process of preparing the same.

One object of the present invention is to provide a process of preparing dithiopyrimidine compounds by direct replacement of an hydroxy or an alkyl-mercapto group on a pyrimidine ring.

Another object of the invention is to produce dithiolated pyrimidine compounds by a treatment of certain hydroxy pyrimidines with phosphorus pentasulfide.

Still another object of the invention is to provide a reaction of certain hydroxy pyrimidines with phosphorus pentasulfide from which a high yield of substantially pure dithiolated compounds is obtained.

A still further object of the invention is to produce new dithiolated pyrimidine derivatives which are useful for the treatment of hyperthyroidism and other conditions in which it is desirable to diminish the amount of active thyroid hormone in the human body.

According to the present invention, a compound having the general formula

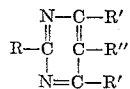

where R is hydroxy, mercapto or alkylmercapto, one R' is hydroxy and the other R' is hydrogen, a lower alkyl or phenyl and R'' is hydrogen or a lower alkyl, is heated with an excess of phosphorus pentasulfide using tetralin or a similar high boiling inert solvent. The temperature may be varied between 120° and 210° C. and the heating time may be varied between 1 and 4 hours, but it is preferred to work in the temperature range of 140° to 185° C. and to heat the reaction mixture from 1½ to 2½ hours. The reaction may be carried out without stirring but the best yields are obtained when the process is performed in an apparatus including a device for constant mechanical stirring.

The following examples may serve to illustrate without limiting the invention.

Example 1

1 part by weight of 2-thiouracil was heated with 3 parts by weight of phosphorus pentasulfide in 10 parts by weight of tetralin at 160–170° C. for 1½ hours with constant stirring. After cooling, the 2,4-dithiouracil was extracted from the separated solids with hot water and was recrystallized from 300 parts by weight of hot water. The compound was obtained as yellow needles which decompose at about 235° C. Yield 65%.

Satisfactory results can be obtained with temperatures as low as 120° C. and as high as 210° C. although the yield is somewhat less outside of the preferred temperature range between 140° and 185° C.

When 2-thio-4-hydroxy-6-methylpyrimidine is substituted for the 2-thiouracil as the starting material, 2,4-dithio-6-methylpyrimidine is obtained in the same manner.

Example 2

1 part by weight of 2-thiothymine was heated with 3 parts by weight of phosphorus pentasulfide and 10 parts by weight of tetralin at 185° C. for 2 hours with mechanical stirring. After cooling the separated solid was washed with hexane and then treated for 40 minutes with 10 parts by weight of 3 normal hydrochloric acid at 100° C. After cooling and separation of the solid, the 2,4-dithiothymine was recrystallized from boiling water or alcohol. The compound was obtained as yellow needles which melted at 281° C. Yield 55%.

Example 3

Five grams of uracil and 15 grams of phosphorus pentasulfide were heated in 50 cc. of tetralin with constant stirring at 160–180° C. for 1.5 hours. By extraction with hot water, dithiouracil was obtained in a yield of 54%.

Similarly treatment of thymine with phosphorus pentasulfide under the conditions of Example 3 yields 2,4-dithiothymine and treatment of 2,4-dihydroxy-6-methylpyrimidine with phosphorus pentasulfide at elevated temperatures between 140–185° C. yields 2,4-dithio-6-methylpyrimidine.

Example 4

Two grams of 2-ethylmercapto-4-hydroxy-5-methylpyrimidine and 6 grams of phosphorus pentasulfide were heated 2 hours at 140–150° C. with stirring in 25 cc. of tetralin. Dithiothymine in excess of 70 per cent of theory was isolated.

Similarly treatment of 2-methylmercapto-4-ethyl-5-methyl-6-hydroxypyimidine with phosphorus pentasulfide at a temperature between 140 and 150° C. for about 2 hours yields 2,6-dithio-4-ethyl-5-methylpyrimidine.

Example 5

3.5 gm. 4-phenyl-2-thio-6-hydroxypyrimidine and 10 gm. of phosphorus pentasulfide were heated 1.5 hours at 170–180° C. in 50 cc. of tetralin. By extraction with hot ethanol there was obtained 4-phenyl-2,6-dithiopyrimidine in 70 per cent yield. M. P. 255–259° C.

What we claim is:

1. A process of preparing dithiopyrimidine compounds which comprises heating the compound having the general formula

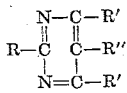

where R is selected from the group consisting of hydroxy, mercapto and alkylmercapto, one R' is hydroxy and the other R' is selected from the group consisting of hydrogen, lower alkyl and phenyl and R" is selected from the group consisting of hydrogen and lower alkyl, with an excess of phosphorus pentasulfide in a high boiling inert solvent at a temperature between 120° and 210° C. for 1 to 4 hours, and obtaining the corresponding dithiolated compound.

2. The process as claimed in claim 1 in which the reaction is carried out at a temperature between 140° and 185° C.

3. A process as claimed in claimed 1 in which the reaction mixture is heated to a temperature between 140° and 185° C. for 1½ to 2½ hours.

4. A process as claimed in claim 1 in which tetralin is used as solvent.

5. A process as claimed in claim 1 in which the reaction is carried out with constant stirring.

6. A process of preparing 2,4-dithiouracil which comprises heating one part by weight of 2-thiouracil with three parts by weight of phosphorus pentasulfide in ten parts by weight of tetralin at 160° to 170° C. for 1½ hours with constant stirring, cooling, and extracting the 2,4-dithiouracil from the separated solids with hot water.

7. A process of preparing 2,4-dithiothymine which comprises heating two parts by weight of 2-ethylmercapto-4-hydroxy-5-methylpyrimidine with 6 parts by weight of phosphorus pentasulfide for 2 hours at 140° to 150° C. with stirring in 25 parts by volume of tetralin and isolating the 2,4-dithiothymine formed.

8. A process of preparing 4-phenyl-2,6-dithiopyrimidine which comprises heating 3.5 parts by weight of 4-phenyl-2-thio-6-hydroxypyrimidine with 10 parts by weight of phosphorus pentasulfide for 1½ hours at 170° to 180° C. in 50 parts by volume of tetralin and extracting with hot ethanol to obtain 4-phenyl-2,6-dithiopyrimidine.

9. 4-phenyl-2,6-dithiopyrimidine.

GEORGE H. HITCHINGS.
GERTRUDE B. ELION.